United States Patent
Beer et al.

(10) Patent No.: US 8,464,602 B2
(45) Date of Patent: Jun. 18, 2013

(54) GEAR SHIFT FORK FOR SHIFTING A TRANSMISSION

(75) Inventors: Uwe Beer, Fahrland (DE); Michael Drabek, Schenkenberg (DE)

(73) Assignee: ZF Friedrichshafen, Friedrichshafen (DE)

( * ) Notice: Subject to any disclaimer, the term of this patent is extended or adjusted under 35 U.S.C. 154(b) by 1134 days.

(21) Appl. No.: 10/516,121

(22) PCT Filed: May 24, 2003

(86) PCT No.: PCT/EP03/05437
§ 371 (c)(1),
(2), (4) Date: Nov. 29, 2004

(87) PCT Pub. No.: WO03/102448
PCT Pub. Date: Dec. 11, 2003

(65) Prior Publication Data
US 2005/0199084 A1    Sep. 15, 2005

(30) Foreign Application Priority Data
May 31, 2002 (DE) .................................. 102 24 308

(51) Int. Cl.
*F16H 63/32* (2006.01)
(52) U.S. Cl.
USPC .................. 74/473.37; 74/473.36; 74/335
(58) Field of Classification Search
USPC ............... 74/473.37, 473.36, 473.24, 473.25, 74/473.26, 335, 473.1
See application file for complete search history.

(56) References Cited

U.S. PATENT DOCUMENTS

| 2,323,516 A | * | 7/1943 | Cipullo ..................... 74/473.1 |
| RE22,965 E | * | 1/1948 | Gates ......................... 188/140 R |
| 3,731,554 A | * | 5/1973 | Renk ......................... 74/473.21 |
| 4,716,779 A | | 1/1988 | Heinzelmann |
| 5,264,673 A | * | 11/1993 | Powell ......................... 200/401 |
| 5,385,223 A | * | 1/1995 | Certeza ......................... 192/219 |
| 5,743,147 A | | 4/1998 | Gazyakan |
| 6,318,206 B1 | | 11/2001 | Krämer |

FOREIGN PATENT DOCUMENTS

| DE | 28 05 044 | | 8/1979 |
| DE | 198 43 584 | A1 | 3/2000 |
| DE | 199 19 270 | A1 | 11/2000 |
| EP | 0 232 279 | B1 | 8/1987 |

(Continued)

OTHER PUBLICATIONS

Description of EP0384157. European Patent Office. <http://epo.worldlingo.com/wl/epo/epo.html?ACTION=description-retrieval&OPS=ops.epo.org&LOCALE=en_EP&FORMAT=docdb&COUNTRY=EP&NUMBER=0384158&KIND=A1&T=1>. Nov. 5, 2009.*

*Primary Examiner* — Phillip A Johnson
*Assistant Examiner* — Daniel Yabut
(74) *Attorney, Agent, or Firm* — Davis & Bujold, PLLC

(57) ABSTRACT

A shifting rocker (2) for a transmission comprises two arms (4, 6), between which a mount for a sliding sleeve is provided. The shifting rocker (2) is mounted in a transmission housing at two bearing points (20, 22) such that it can pivot. Further, a lever arm (16) is positioned on the shifting rocker (2), via which force is applied to the shifting rocker (2) for the purpose of pivoting the shifting rocker (2) about the bearing points (20, 22). The lever arm (16) is positioned on the shifting rocker (2) in the area (24) between the two bearing points (20, 22).

16 Claims, 1 Drawing Sheet

FOREIGN PATENT DOCUMENTS

| | | |
|---|---|---|
| EP | 0 384 158 A1 | 1/1990 |
| GB | 2 013 796 A | 8/1979 |
| JP | 58010221 A * | 1/1983 |
| JP | 10267122 A | 10/1998 |
| JP | 2003028296 A * | 1/2003 |
| WO | WO-95/16869 | 6/1995 |

* cited by examiner

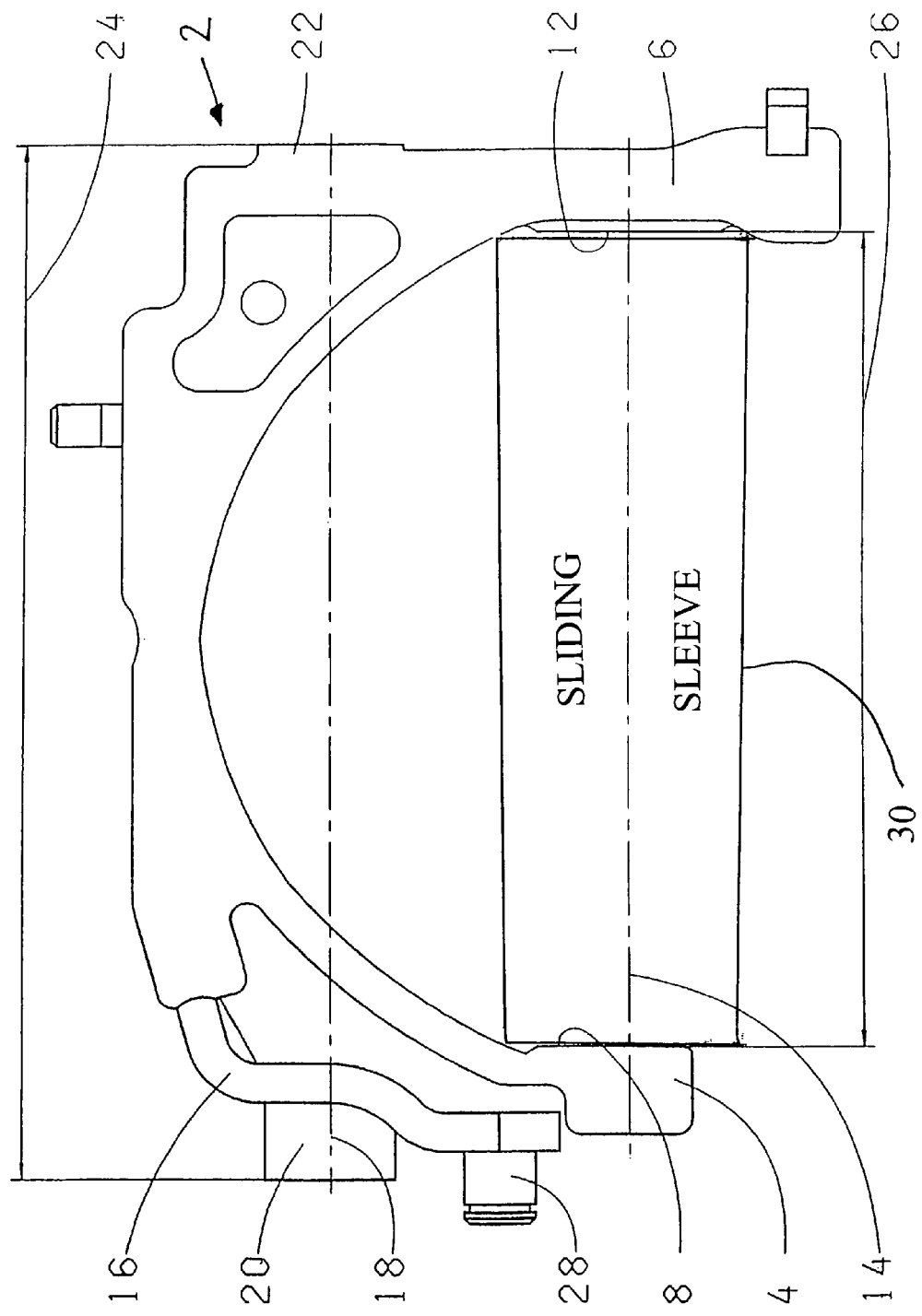

GEAR SHIFT FORK FOR SHIFTING A TRANSMISSION

This application is a national stage completion of PCT/EP 03/05437 filed May 24, 2003 which claims priority from German Application Serial No. 102 24 308.5 filed May 31, 2002.

FIELD OF THE INVENTION

The invention relates to a shifting rocker for shifting the gears of a transmission.

BACKGROUND OF THE INVENTION

In the shifting of gears of a transmission, especially a motor vehicle transmission, based upon specific requirements, in addition to shifter forks shifting rockers are also used. In such cases the shifting rockers are mounted on pins in the transmission housing and execute the axial movement of a sliding sleeve that is actuated by the shifting rocker, generally in the direction opposite the direction of actuation of the shifting rocker, as the direction of movement is reversed at the bearing.

From EP 0 232 279 B1 the fundamental design for a shifting rocker is known, however in this arrangement the direction of actuation of the shifting rocker is the same as the direction of movement of the sliding sleeve. The shifting rocker, which is mounted in the transmission housing, is actuated laterally on only one side via a lever, which meshes with a push rod by which it is also moved. Because of this one-sided actuation, the force that is applied to the shifting rocker is not applied optimally at the center of the shifting rocker, as would be necessary for the application of uniform motion to the points of contact for the sliding sleeve. This can lead to a tilting of the shifting rocker at the bearing points and can inhibit the free motion of the sliding sleeve.

The object of the invention is to improve the application of actuating force to the shifting rocker.

SUMMARY OF THE INVENTION

According to the invention, a shifting rocker for a transmission is proposed, which comprises two arms, between which a mount for a sliding sleeve is provided, and which comprises two bearing points at which the shifting rocker is mounted such that it can pivot in a transmission housing. A lever arm is further provided on the shifting rocker, via which force is applied to the shifting rocker for the purpose of pivoting the shifting rocker on the bearing points, with the lever arm on the shifting rocker being positioned in the area between the two bearing points. Here the term "area between" is based upon a view of the shifting rocker as depicted in the drawing, in other words from a side view. In one advantageous embodiment the lever arm is positioned on the shifting rocker in the area between the two arms. A further embodiment shows the lever arm at the center between the two bearing points or the two arms. Particularly advantageous is an embodiment in which the point at which force is applied to the lever arm lies beyond the two bearing points or beyond the two arms. In a further embodiment one of the bearing points is located on the lever arm.

With the embodiment of the shifting rocker pursuant to the invention, the application of force to the shifting rocker can take place at any point on the shifting rocker, which serves to ensure the widest range of design possibilities for the arrangement of the shift rods and the force-transferring lever, with a lateral arrangement being best supported, without the danger of the shifting rocker or the sliding sleeve becoming jammed.

BRIEF DESCRIPTION OF THE DRAWINGS

The sole FIGURE shows a shifting rocker 2 for a manual transmission.

DETAILED DESCRIPTION OF THE INVENTION

The FIGURE shows a shifting rocker 2 for a manual transmission, which is not illustrated here. The shifting rocker 2 comprises two arms 4 and 6, between which a mount for a sliding sleeve, diagrammatically shown as element 30, is positioned. A first component 8 of the mount is located on the arm 4. A second component 12 of the mount is located on the arm 6. A common axis of rotation 14 extends through the two components 8 and 12. The shifting rocker 2 is mounted inside the transmission housing on a first bearing point 20 and a second bearing point 22, such that it can rotate about an axis of rotation 18. In the embodiment shown the first bearing point 20 is located on a lever arm 16, on which a pin 28 is also provided, which serves as a point at which force is applied to the shifting rocker 2 in order to actuate the shifting rocker 2. In the actuation of the shifting rocker 2 the shifting rocker 2 is turned on the rotational axis 18, causing a shifting of the rotational axis 14 and thereby a shifting of the sliding sleeve perpendicular to the plane of the drawing. With this shift, the sliding sleeve rotates about the axis of rotation 14 between the components 8 and 12 of the mount. The lever arm 16 is positioned on the shifting rocker 2 in the area 24 between the two bearing points 20 and 22. In this manner the actuating force that is introduced via the pin 28 and the lever arm 16 into the shifting rocker 2 can be well supported in the housing on the bearing points 20 and 22, without the danger of the shifting rocker 2 tilting at the bearing points 20 and 22 as a result of an actuating force applied beyond the bearing points 20 and 22. The positioning of the lever arm 16 on the shifting rocker 2 also lies in the area 26 between the two arms 4 and 6. The bearing point 20 of the shifting rocker 2 shown here may also be located directly on the arm 4. The first sliding sleeve mount 8 and the opposed second sliding sleeve mount 12 each have a laterally inwardly facing surface, with the lever arm 16 being connected to the shifting rocker 2 in an area located laterally between the inwardly facing surfaces. The first arm 4 is integral with an end of a bridge and the second arm 6 is integral with an opposite end of the bridge. The first and the second arms 4, 6 extend away from the bridge to form an essentially U-shaped member. An end of the first arm 4, remote from the bridge has the first sliding sleeve mount 8. The second arm 6 comprises the second sliding sleeve mount 12, also remote from the bridge, and a second bearing point 22, adjacent the bridge. The first end of the lever arm 16 is integrally coupled to the bridge remote from the second pivot axis 18. The first bearing point 20 is supported along the lever arm 16 at a location which is spaced from the coupling of the lever arm 16 to the bridge.

REFERENCE NUMERALS 2 shifting rocker
4 arm
6 arm
8 first component of the mount
12 second component of the mount
14 axis of rotation
16 lever arm 18 axis of rotation
20 bearing point
22 bearing point
24 area
26 area
28 pin Wherefor, we claim:

1. A shifting rocker (2), for a transmission, comprising:
a first arm (4) having a first sliding sleeve mount (8) and an integral second arm (6) having an opposed second sliding sleeve mount (12), the first sliding sleeve mount (8) and the second sliding sleeve mount (12) being coaxially aligned with one another to define a first pivot axis (14) pivotally supporting a sliding sleeve therebetween;
a lever arm (16) being directly coupled to and formed integral with the shifting rocker (2), the lever arm (16) supporting a first bearing point (20), and the second arm (6) supporting a second bearing point (22) and together the first bearing point (20) and the second bearing point (22) define a second pivot axis (18) which facilitates pivoting movement of the shifting rocker (2) about the second pivot axis (18);
the first pivot axis (14) being substantially parallel to the second pivot axis (18);
a first end of the lever arm (16) being coupled to the shifting rocker (2) at a location remote from the first and the second pivot axis (14, 18) and the lever arm (16) extending from the shifting rocker (2), along and adjacent but spaced from the first arm (4), to a location between the first pivot axis (14) and the second pivot axis (18);
the first sliding sleeve mount (8) and the opposed second sliding sleeve mount (12) each have a laterally inwardly facing surface, and the lever arm (16) being connected to the shifting rocker (2) in an area located laterally between the inwardly facing surfaces;
a second end of the lever arm (16), remote from the first end of the lever arm (16), including a pin (28), both the pin (28) and the second end of the lever arm (16) being located between the first pivot axis (14) and the second pivot axis (18), and a shifting force being applied to the pin (28) for pivoting the shifting rocker (2) about the second pivot axis (18), and the pin (28) extending generally parallel the first and the second pivot axes (14, 18); and
the first bearing point (20) being supported along the lever arm (16) at a location which is spaced from the coupling of the lever arm (16) to the shifting rocker (2) and also spaced from the pin (28) supported by the second end of the lever arm (16), and at least a remote portion of the pin (28) being laterally displaced from the second sliding sleeve mount (12) by a greater distance than both a lateral displacement of a remote end of the first arm (4) from the second sliding sleeve mount (12) and a lateral displacement of a remote end of the first bearing point (20) from the second sliding sleeve mount (12).

2. The shifting rocker (2) according to claim 1, wherein the lever arm (16) is connected to the shifting rocker (2) in the area (24) located between the first bearing point (20) and the second bearing point (22) with the second pivot axis (18) located between the first pivot axis (14) and the connection of the lever arm (16) to the shifting rocker (2).

3. The shifting rocker (2) according to claim 1, wherein the lever arm (16) extends from the shifting rocker (2) and spans the second pivot axis (18).

4. The shifting rocker (2) according to claim 1, wherein the first end of the lever arm (16) is integrally coupled to the shifting rocker (2) on a side of the second pivot axis that is remote from the first pivot axis (14).

5. The shifting rocker (2) according to claim 1, wherein the lever arm (16) is located between the pin (28) and the shifting rocker (2) and the pin (28) extends from the lever arm (16) away from the shifting rocker (2).

6. The shifting rocker (2) according to claim 1, wherein the first sliding sleeve mount (8) and the second sliding sleeve mount (12) face one another, and
the lever arm (16), the second arm (6) and the first arm (4) are located between the first bearing point (20) and the second bearing point (22) and the first and the second bearing points (20, 22) both face outwardly away from the shifting rocker (2).

7. The shifting rocker (2) according to claim 1, wherein the lever arm (16) is connected to the shifting rocker (2) at an intermediate location which is axially located between the first sliding sleeve mount (8) and the second sliding sleeve mount (12).

8. The shifting rocker (2) according to claim 1, wherein the pin (28) and the first and the second bearing points (20, 22) are formed integral and unitary with the shift rocker (2), and
the first bearing point (20) extends from the lever arm (16) away from the shift rocker while the second bearing point (22) extends from both the first bearing point (20) and the shift rocker (1).

9. The shifting rocker (2) according to claim 1, wherein at least a remote portion of the pin (28) is laterally displaced from the second sliding sleeve mount by a greater distance than both a lateral displacement of a every portion of the first arm from the second sliding sleeve mount and a lateral displacement of every portion of the first bearing point from second sliding sleeve mount (12).

10. A shifting rocker (2), for a transmission, consisting of:
a first arm (4) having a sliding sleeve mount (8) and an integral second arm (6) having an opposed sliding sleeve mount (12), the sliding sleeve mount (8) and the opposed sliding sleeve mount (12) facing and being coaxially aligned with one another to define a first pivot axis (14) pivotally supporting a sliding sleeve therebetween;
a lever arm (16) being directly coupled to and formed integral with the shifting rocker (2) such that the lever arm (16) is rigidly, immovably fixed with respect to the shifting rocker (2), the lever arm (16) supporting a first bearing point (20), and the second arm (6) supporting a second bearing point (22) and the first bearing point (20) and the second bearing point (22) together define a second pivot axis (18) which facilitates pivoting movement of the shifting rocker (2) about the second pivot axis (18) via the first and second bearing points (20, 22) with the lever arm (16) and the first and the second arms (4, 6) being located between the first bearing point (20) and the second bearing point (22);
the first pivot axis (14) being substantially parallel to the second pivot axis (18);
the first sliding sleeve mount (8) and the opposed second sliding sleeve mount (12) each have a laterally inwardly facing surface, and the lever arm (16) being connected to the shifting rocker (2) in an area located laterally between the inwardly facing surfaces and the lever arm (16) terminating at a location between the first pivot axis (14) and the second pivot axis (18);
the second end of the lever arm (16) supports a pin (28) and both the pin (28) and the second end of the lever arm (16) are located between the first pivot axis (14) and the second pivot axis (18) so as to facilitate providing a shifting force to be applied to the pin (28) for pivoting the shifting rocker (2) about the second pivot axis (18);

a first end of the lever arm (16) terminates at and is connected to the shifting rocker (2) in an area (26) located between the two pivot points (20, 22) with the second pivot axis (18) being located between the first pivot axis (14) and the connection of the lever arm (16) to the shifting rocker (2), and the pin (28) extending generally parallel the first and the second pivot axes (14, 18); and the first bearing point (20) being supported along the lever arm (16) at a location which is spaced from the connection of the lever arm (16) to the shifting rocker (2) and also spaced from the pin (28) supported by the second end of the lever arm (16), and at least a remote portion of the pin (28) being laterally displaced from the second sliding sleeve mount (12), generally parallel to both the first and second pivot axes (14, 18), by a greater distance than both a lateral displacement of a remote end of the first arm (4) from the second sliding sleeve mount (12) and a lateral displacement of a remote end of the first bearing point (20) from the second sliding sleeve mount (12).

11. The shifting rocker (2) according to claim 10, wherein the lever arm (16) extends from the shifting rocker (2) and spans the second pivot axis (18).

12. The shifting rocker (2) according to claim 10, wherein a first end of the lever arm (16) is integrally coupled to the shifting rocker (2) on a side of the second pivot axis that is remote from the first pivot axis (14).

13. The shifting rocker (2) according to claim 10, wherein the lever arm (16) is located between the pin (28) and the shifting rocker (2) and the pin (28) extends from the lever arm (16) away from the shifting rocker (2).

14. A shifting rocker (2), for a transmission, consisting of:

first and second arms (4, 6), the first arm (4) being integral with an end of a bridge and the second arm (6) being integral with an opposite end of the bridge, the first and the second arms (4, 6) extending away from the bridge to form an essentially U-shaped member;

an end of the first arm (4), remote from the bridge having a first sliding sleeve mount (8) and the second arm (6) comprising a second sliding sleeve mount (12), remote from the bridge, and a second bearing point (22), adjacent the bridge, the first sliding sleeve mount (8) and the second sliding sleeve mount (12) being coaxially aligned with one another to define a first pivot axis (14);

a lever arm (16) comprising a first end, a second end and a first bearing point (20) which is located along the lever arm (16) between the first and the second ends of the lever arm (16), the first bearing point (20) and the second bearing point (22) being coaxially aligned with each other to define a second pivot axis (18);

the first pivot axis (14) being parallel to the second pivot axis (18) and the lever arm (16) extending closely along but spaced from the first arm (4) so that the first arm (4) is located between the lever arm (16) and the second arm (6);

the first end of the lever arm (16) being integrally coupled to the bridge remote from the second pivot axis (18) and the lever arm (16) extends adjacent the first arm (4) such that the second end of the lever arm (16) is located between the first pivot axis (14) and the second pivot axis (18);

the first sliding sleeve mount (8) and the opposed second sliding sleeve mount 12 each have a laterally inwardly facing surface, and the lever arm 16 being connected to the shifting rocker (2) in an area located laterally between the inwardly facing surfaces;

the second end of the lever arm (16) comprises a pin (28) to which a shifting force is applied to facilitate pivoting of the shifting rocker (2) about the second pivot axis (18), the lever arm (16) being located between the pin (28) and the shifting rocker (2) and the pin (28) extending from the lever arm (16) directly away from the shifting rocker (2), and the pin (28) extending generally parallel the first and the second pivot axes (14, 18); and the first bearing point (20) being supported along the lever arm (16) at a location which is spaced from the coupling of the lever arm (16) to the bridge and also spaced from the pin (28) supported by the second end of the lever arm (16), and at least a portion of the pin (28) having a greater lateral displacement from the second sliding sleeve mount (12) than any portion of either the first arm (4) or the first bearing point (20) have from the second sliding sleeve mount (12), and the direction of lateral displacement being parallel to both the first and second pivot axes (14, 18).

15. The shifting rocker (2) according to claim 14, wherein the lever arm (16) extends from the bridge and spans the second pivot axis (18).

16. The shifting rocker (2) according to claim 14, wherein the shifting rocker (2) pivots about the second pivot axis (18) and the first end of the lever arm (16) is integrally coupled to the shifting rocker (2) on a side of the second pivot axis that is remote from the first pivot axis (14).

* * * * *